June 11, 1968    J. E. LEWIS    3,388,399
ANTENNA FEED FOR TWO COORDINATE TRACKING RADARS
Filed March 25, 1965

INVENTOR
JAMES E. LEWIS

BY
ATTORNEYS

United States Patent Office 3,388,399
Patented June 11, 1968

3,388,399
ANTENNA FEED FOR TWO COORDINATE TRACKING RADARS
James E. Lewis, Washington, D.C., assignor to the United States of America as represented by the Secretary of the Navy
Filed Mar. 25, 1965, Ser. No. 442,840
4 Claims. (Cl. 343—783)

ABSTRACT OF THE DISCLOSURE

An antenna feed having circular cross sections for use in a radar system supplying range and angle information. The device includes two circular waveguide sections which are individually dimensioned to propagate energy in different modes so as to yield sum and difference signals. Energy in the $TE_{11}$ mode is coupled out of one of the circular waveguide sections to provide range information while energy in the $TM_{01}$ mode is coupled out of the other circular waveguide section to provide angle information.

---

Figure 1:
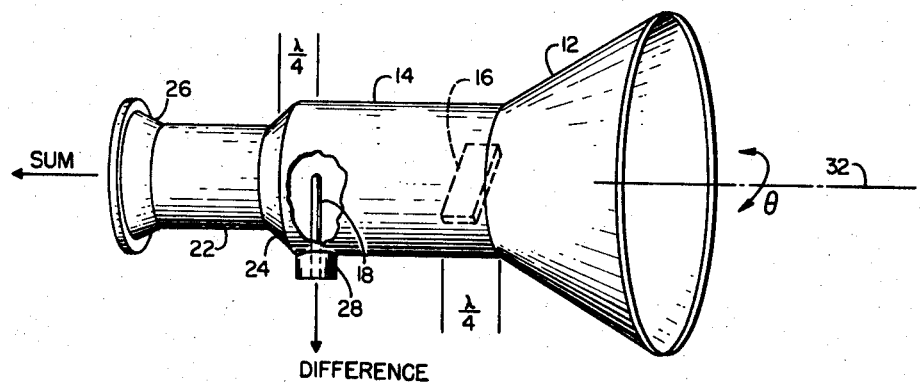

The invention described herein may be manufactured and used by or for the Government of the United States of America for governmental purposes without the payment of any royalties thereon or therefor.

The present invention relates to a microwave antenna feed and more particularly to a microwave component, having circular crossections, which is suitable for use as an antenna feed in a two coordinate radar system and which supplies a range information or sum signal in one mode and an angle information or difference signal in another mode.

Radar systems have been developed wherein two separate signals are produced to individually be indicative of two parameters, or coordinates, typically target range and target angular position, either in elevation or azimuth. The range signal is conventionally of relatively large magnitude, for maximum sensitivity, and is often called the sum signal, a term which reflects the practice of adding two signals to produce the range signal. The sum signal is conventionally largest when the antenna is aimed at the target. In contrast, the angle signal is often called the difference signal, a term which is reflective of the practice whereby two signals are subtracted, for maximum resolution, to produce the angle signal, which signal is conventionally nulled when the antenna is aimed at the target. In one of these previous radar systems, the two coordinate tracking sense is developed by employing two rectangular horns whose outputs are fed into a microwave hybrid, such as a "rat race" or a "magic T." The output of the hybrid is in the form of a sum or ranging signal and of a difference or angle signal. In another previous radar system, a relatively complex rectangular horn antenna feed assembly is dimensioned to be excited in the $TE_{10}$ and $TE_{20}$ modes, the $TE_{10}$ mode signal yielding the sum or range information and the $TE_{20}$ mode signal being nulled when the target is on axis.

The general purpose of this invention is to provide sum and difference signals for the same general purpose as in the prior two coordinate radar systems, but with a simpler microwave feed component having improved angular resolution characteristics. A modified version of the invention transmits circular polarized energy and has the added capability of triggering a linear polarized device aboard an aircraft or space vehicle without regard to its aspect.

Accordingly, an object of the present invention is the provision of a microwave antenna feed which has circular crossections.

Another object is to provide a microwave antenna feed which produces sum and difference signals.

Another object is to provide an antenna feed for transmitting circular polarized energy capable of triggering linear polarized devices without regard to the orientation of their polarization.

Yet another object is the provision of a microwave antenna feed which is suitable for use in a radar system to produce a range or sum signal and an angle or difference signal.

A still further object is the provision of a microwave antenna feed having circular crossections and being suitable for use in a two coordinate radar system to produce a sum signal in one mode and a difference signal in another mode.

The exact nature of this invention as well as other objects and advantages thereof will be readily apparent from consideration of the following specification relating to the annexed drawing in which:

FIG. 1 is a prespective view of an embodiment of the invention and

Figure 2:
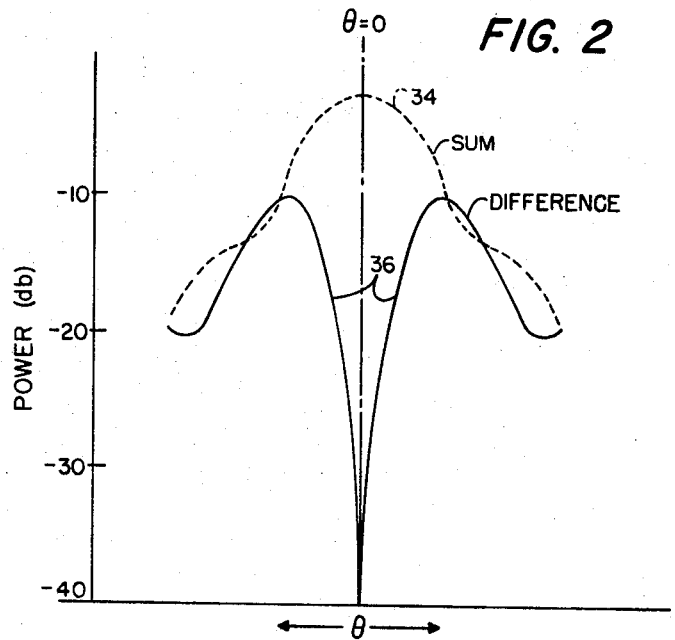

FIG. 2 contains curves which are helpful in understanding the operation of the embodiment of FIG. 1.

Referring now to FIG. 1, the reference numeral 12 is a conical horn which is effective, with conventionally used linearly, circularly and elliptically polarized microwave energy to electromagnetically couple the illustrated apparatus with free space. A circular waveguide section 14 is joined to the smaller end of horn 12. The quarter wave plate 16 may be located, if desired, in section 14 adjacent the horn 12 for polarization conversion purposes. Conventional coupling probe 18, typically a capacitive probe, is located approximately a quarter wave length from the other end of section 14. A smaller diameter circular waveguide section 22 is joined to the larger diameter section 14 by the tapered waveguide section 24. Mechanical coupling elements 26 and 28, located as shown, are provided for coupling the assembly of FIG. 1 with an electronic utilization system, which typically could be a two coordinate radar set. However, it should be recognized that the apparatus of FIG. 1 could also be useful in combination with direction finders, boresighting equipment and instrument landing and navigational systems.

In explaining the operation of the assembly shown in FIG. 1, it will also be helpful to refer to the curves in FIG. 2. While, as previously explained, the invention is of more general utility, the apparatus of FIG. 1, without quarter wave plate 16, will be described as being used in combination with a conventional pulsed type radar system. During the operation of such a combination, an energy pulse from the transmitter is received through the coupling element 26. This energy pulse is of a frequency which excites waveguide sections 22 and 14 to propagate the energy in the $TE_{11}$ or dominant mode and is linearly polarized in a direction such that energy is not accepted by probe 18. The energy pulse is further propagated by horn 12 to feed an antenna, not shown, which further propagates the energy into free space.

As is well known, if the antenna is properly oriented to cause the propagated energy pulse to illuminate a target, reflections of the pulse are received by the antenna and focused into the horn 12. If the propagation axis of the antenna is perfectly aligned with the illuminated target, the reflected energy returned by the antenna is centrally focused along the axis 32 into horn 12 and causes the propagation of only the $TE_{11}$ or dominant mode through the waveguide sections 14 and 22 and through the coupling element 26 into the ranging circuits of the radar system.

As shown by the curve 34 in FIG. 2, the maximum $TE_{11}$ signal occurs when the reflected energy is focused symmetrically along axis 32, that is, when angle $\theta=0°$, it being of course recognized that angle $\theta$ is not only a measure of the off axis focusing of reflected energy by the antenna but also a measure of the misalignment of the antenna and the reflecting target. From curve 34 and the above described characteristics it will be recognized that the $TE_{11}$ mode output signal at coupling element 26 is equivalent to, and can be used for ranging purposes in place of, the well known sum signals of the prior art radar systems. It will also be recognized that because of the direction of the polarization, the reflected $TE_{11}$ mode energy is not accepted by probe 18.

If the propagation axis of the antenna is not perfectly aligned with the illuminated target, the reflected energy is not focused into horn 12 symmetrically along axis 32. As is well known, this circumstance causes the focused energy entering the large end of horn 12 to be of non-uniform phase. As a result, a portion of the reflected energy is propagated in waveguide section 14 in the $TM_{01}$ mode. As shown by curve 36 in FIG. 2, the size of this portion is dependent upon the amount of misalignment, that is, the angle $\theta$. The tapered section 24 is dimensioned to function as a short which reflects the $TM_{01}$ mode energy. Since the $TM_{01}$ mode energy (which is at a maximum a quarter wave length before the shorting section 24) is radially symmetrical, it is accepted by the probe 18.

As shown by curve 36 in FIG. 2, the $TM_{01}$ signal is a minimum when $\theta=0°$, that is when the antenna is perfectly aligned with the reflecting target, and increases rapidly as the target and antenna are misaligned. Further, although it has not been shown in FIG. 2 in the interest of drafting convenience, the $TM_{01}$ signal is of opposite phase when the target is located on different sides of the antenna axis. From curve 36 and the above described characteristics it will be recognized that the $TM_{01}$ mode output signal provided by probe 18 is equivalent to, and can be used in place of, the well known difference, or angle, signals of the prior art radar systems.

If quarter wave plate 16 is included in the apparatus of FIG. 1, it can be used to transmit circular polarized energy for triggering linear polarized devices, without regard to their orientation, which may be aboard aircraft or space vehicles. When so used the linear polarized pulse energy being propagated in waveguide section 14 is converted into circular polarized energy by quarter wave plate 16 and thereafter propagated through horn 12 for further propagation into free space. If the device being triggered is a transponder, the apparatus of FIG. 1 can obviously be used in receiving the transmitted signal from the transponder.

From the foregoing it will be evident that the disclosed invention, and specifically the described embodiment, provides a microwave antenna feed which is structurally simple and has circular cross-sections and which is suitable for use in a two coordinate radar system to produce a range or sum signal in one mode and an angle or difference signal in another mode, and, when transmitting circular polarized energy, has the added capability of triggering linear polarized devices without regard to their orientation.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. In a radar set which radiates energy at a predetermined frequency and includes a transmitter and a receiver having ranging and angle circuits, a microwave antenna feed assembly comprising:

first and second coupling means for coupling said antenna feed assembly to said radar set;

smaller circular waveguide means connected to said first coupling means;

larger circular waveguide means connected to said second coupling means;

tapered circular waveguide means joining said smaller and larger circular waveguide means;

conical horn means connected to said larger circular waveguide means;

the dimensions of said larger, smaller and tapered circular waveguide means being such that energy at said predetermined frequency is propagated in all three of said circular waveguide means in the $TE_{11}$ mode but is propagated in the $TM_{01}$ mode only in said larger circular waveguide means;

whereby said feed assembly may be included in said radar set to receive linearly polarized energy at said predetermined frequency from said transmitter and to provide energy in the $TE_{11}$ mode to said ranging circuits through said first coupling means and to provide energy from the $TM_{01}$ mode to said angle circuits through said second coupling means.

2. A microwave antenna feed assembly as set forth in claim 1 and further including a quarter wave plate located in said larger circular waveguide.

3. A microwave antenna feed assembly as set forth in claim 1 wherein said second coupling means is a capacitive probe which is orientated in such a position as not to accept energy received from the transmitter.

4. A microwave antenna feed assembly as set forth in claim 3 and further including a quarter wave plate located in said larger circular waveguide.

References Cited

UNITED STATES PATENTS

| | | | |
|---|---|---|---|
| 2,961,659 | 11/1960 | Kuecken | 343—778 |
| 3,050,701 | 8/1962 | Tang | 333—34 |
| 3,162,828 | 12/1964 | Schmidt et al. | 343—756 |
| 3,267,475 | 8/1966 | Howard | 343—786 |
| 3,142,061 | 7/1964 | Allen | 343—756 |

ELI LIEBERMAN, *Primary Examiner.*